United States Patent [19]
Allardyce et al.

[11] 3,989,096
[45] Nov. 2, 1976

[54] OXIDATION RESISTANT BRAZING

[75] Inventors: Gordon E. Allardyce, Dearborn Heights; Amedee Roy; Claude Belleau, both of Troy, all of Mich.

[73] Assignee: Chrysler Corporation, Highland Park, Mich.

[22] Filed: Nov. 1, 1973

[21] Appl. No.: 411,964

Related U.S. Application Data

[62] Division of Ser. No. 316,145, Dec. 18, 1972, Pat. No. 3,797,087.

[52] U.S. Cl............................ 165/10; 165/DIG. 8; 29/157.3 R
[51] Int. Cl.².......................................... F28D 19/00
[58] Field of Search................ 165/10, 133, DIG. 8; 29/157.3 R

[56] References Cited
UNITED STATES PATENTS

| | | | |
|---|---|---|---|
| 1,892,607 | 12/1932 | Bundy............................ | 165/133 X |
| 2,795,928 | 6/1957 | Huebner, Jr. et al............. | 165/10 X |
| 3,252,506 | 5/1966 | Huebner, Jr...................... | 165/10 |
| 3,627,488 | 12/1971 | Dudley............................ | 165/133 X |

OTHER PUBLICATIONS

Copper Development Assoc., *Aluminum Bronze* CDA Publication No. 31, London, 10/1943, pp. 81, 82.

Churchill, SC *Brazing Part Two*, Industrial Press, NYC, NY, 1963, pp. 78 to 83.

*Primary Examiner*—Albert W. Davis, Jr.
*Attorney, Agent, or Firm*—Talburtt & Baldwin

[57] ABSTRACT

Diffusion-alloying of aluminum into copper brazed joints and structures, particularly for turbine engine regenerator cores.

7 Claims, 10 Drawing Figures

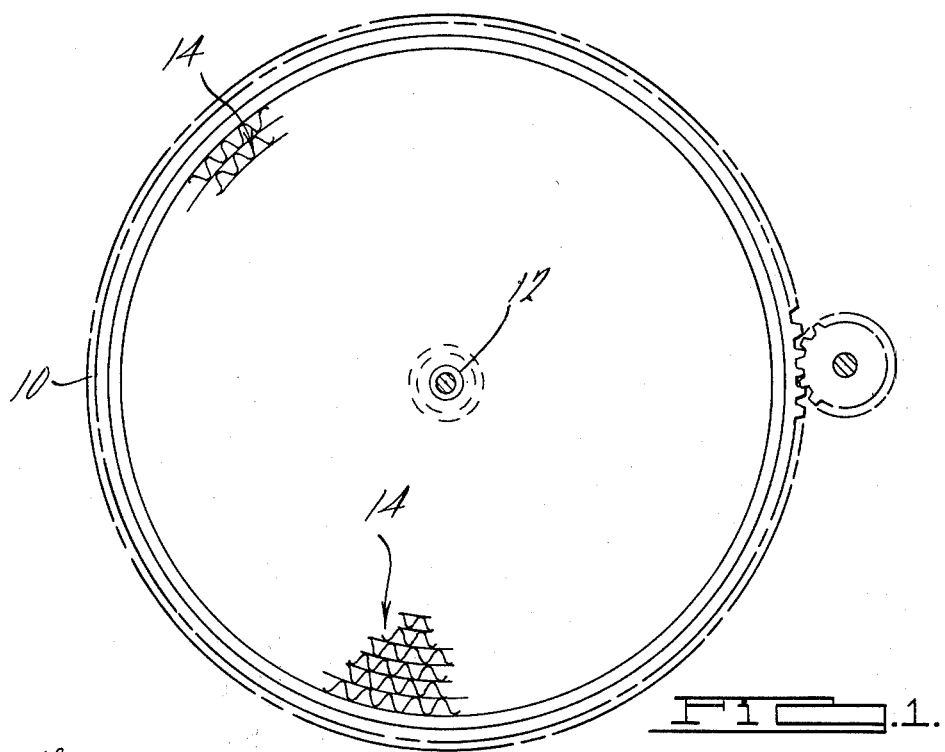
FIG. 1.
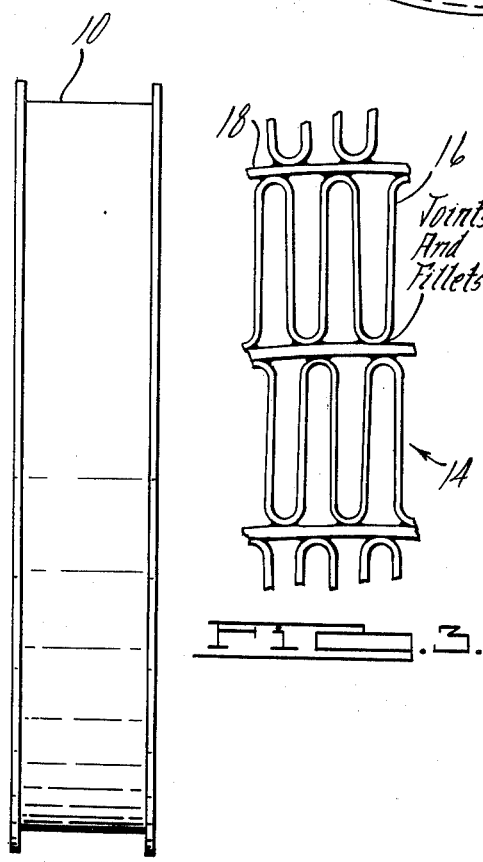
FIG. 2.
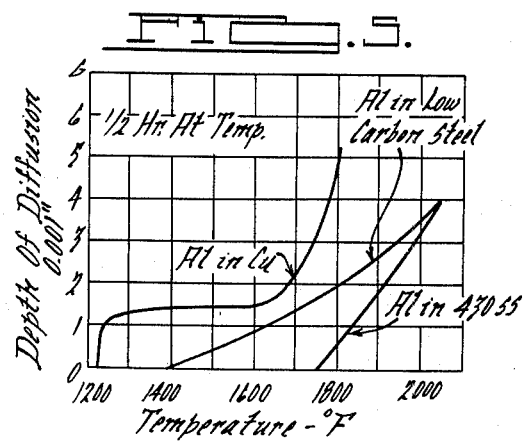
FIG. 3.
FIG. 5.
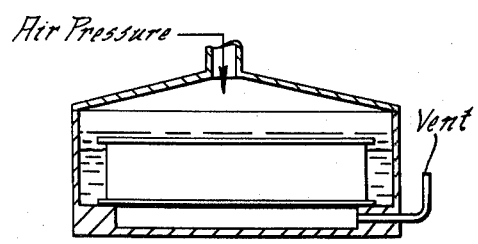
FIG. 4.

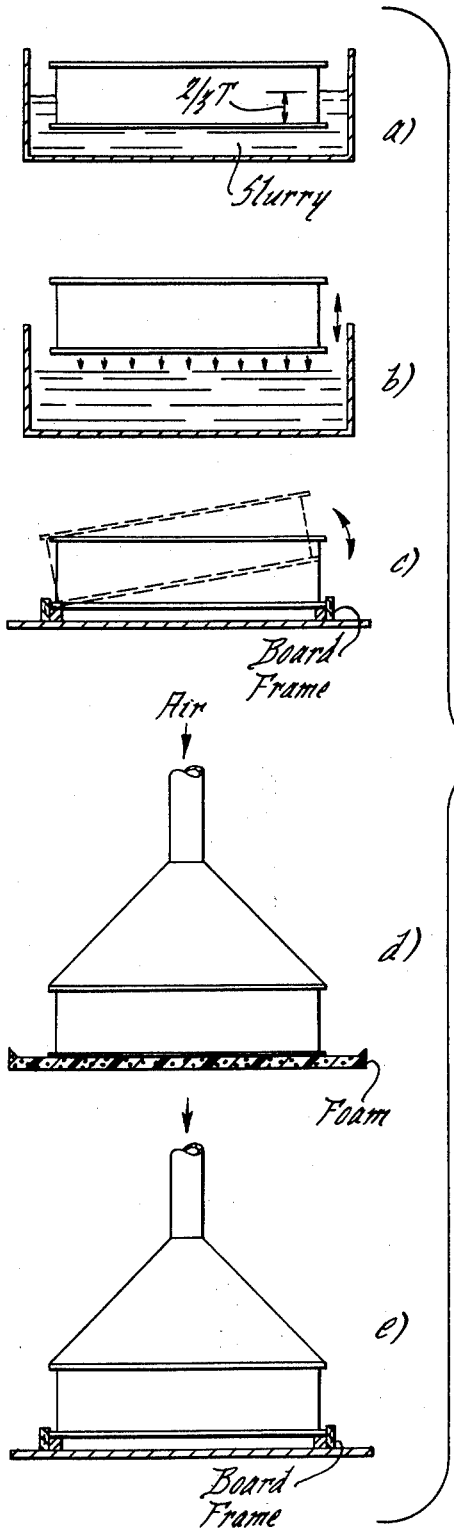
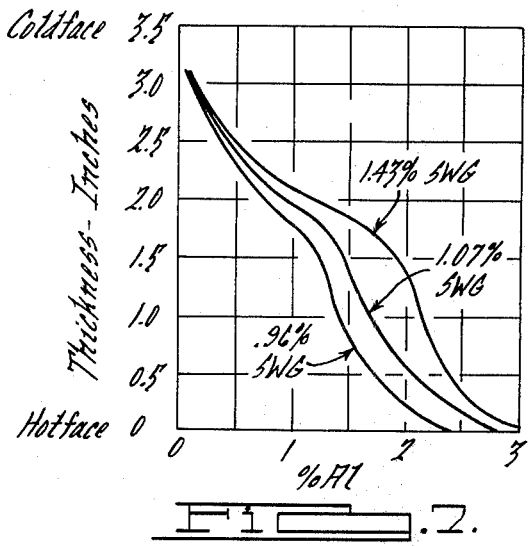
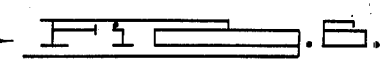
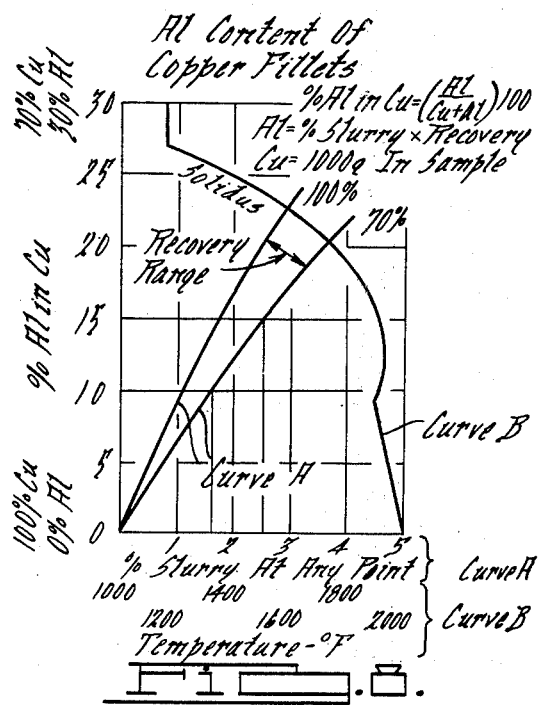
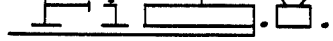

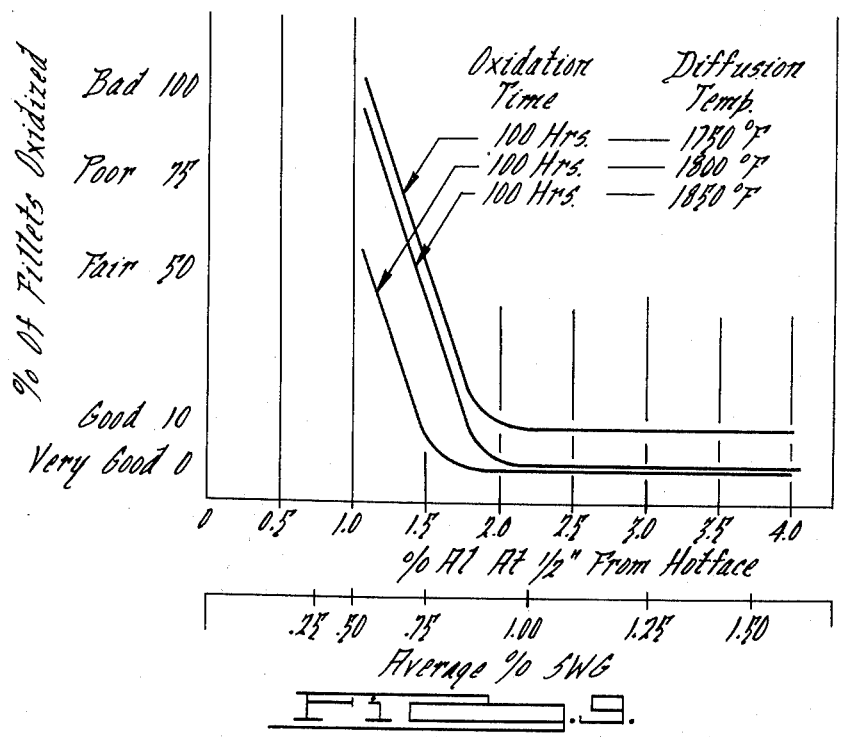
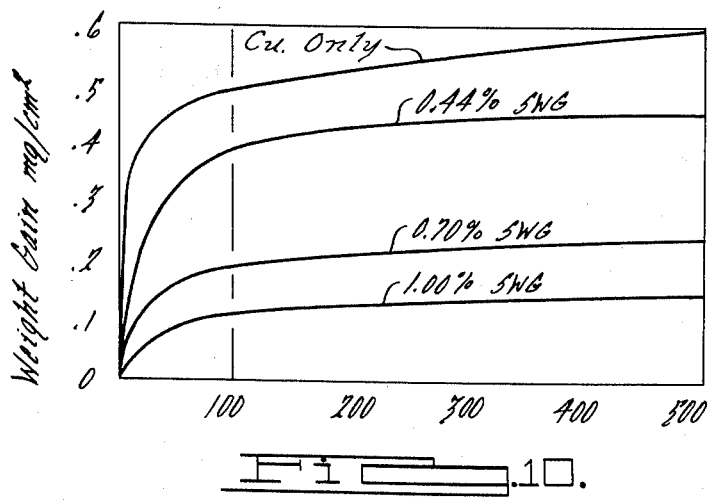

OXIDATION RESISTANT BRAZING

This is a division of application Ser. No. 316,145 filed Dec. 18, 1972, now U.S. Pat. No. 3,797,087, issued Mar. 19, 1974.

BACKGROUND

This invention relates generally to brazing, to oxidation resistant structures, to copper-brazed structures which are rendered oxidation resistant and to a method of diffusion alloying copper brazed joints and fillets, hereinafter referred to simply as "joints", and structures with aluminum. It is specifically concerned with providing oxidation resistant brazed joints in regenerator cores for turbine engines, although it is applicable to copper joints in similar matrix structures and to brazed copper joints generally.

Copper-brazed joints and fillets and related structures are alloyed according to the invention with aluminum for achieving oxidation resistance. A more direct method of copper-brazing with oxidation resistant copper-aluminum alloys, wherein the structure to be brazed is coated with a slurry of copper-aluminum, has proven to be undesirable because of poor "wetting." That is, the aluminum in the copper-aluminum alloy oxidizes and is not readily reduced by hydrogen. Consequently, the molten copper-aluminum alloy does not flow adequately to form suitable joints at the joint locations of the structure to be brazed.

SUMMARY OF THE INVENTION

In a sense, this invention starts with a copper joint, or structure, coats it with aluminum and diffusion alloys the aluminum into and with the copper, and with the structure itself in some instances, to provide an oxidation resistant copper-aluminum brazed joint or structure. Oxidation resistance is improved not only at low temperatures but at elevated temperatures as well. In its preferred form, the invention uses an aluminum slurry for coating metal parts, assemblies and joints thereof with aluminum. The slurry consists of aluminum flake or powder suspended in a suitable vehicle. The slurried surface is heated in a suitable atmosphere, such as hydrogen, until the aluminum melts and diffuses into the surface.

A slurry technique is disclosed herein for coating regenerator matrix passages in such a way as to provide a graded aluminum-copper alloy across the matrix and to promote uniform oxidation resistance of the copper and steel regenerator assembly throughout the temperature gradient encountered during operation in a turbine engine. Regenerator cores are usually made of ferritic stainless steel, such as 430 stainless, although other types of steel may be used.

It is an object of this invention to diffuse aluminum into copper for oxidation resistance.

It is an object of this invention to diffuse aluminum into the structure carrying the copper joint as well, particularly when the structure is steel, to improve the oxidation resistance of the structure as well.

It is another object of this invention to diffuse aluminum into copper joints forming an oxidation resistant copper-aluminum alloy joint in situ.

It is another general object of this invention to diffuse aluminum into the copper joints and steel of a copper brazed steel matrix structure.

It is an object to provide oxidation resistant matrix structures using relatively low cost materials and procedures.

It is an object to provide oxidation resistant joints and structures.

It is a specific object to provide oxidation resistant regenerator cores for turbine engines.

It is an object to provide a method wherein processing techniques of reasonable cost may be used for making copper-brazed stainless steel matrix structures oxidation resistant.

These and other objects of the invention will become apparent from the following description.

BRIEF DESCRIPTION OF THE DRAWINGS

FIG. 1 is a plan view showing the matrix structures of a regenerator core for a turbine engine schematically in part.

FIG. 2 is an end view of FIG. 1.

FIG. 3 is a fragmentary enlarged plan view of a portion of the matrix illustrated in FIG. 1 showing the brazed joints.

FIG. 4 is a schematic showing of a fixture useful in applying slurry to a core.

FIG. 5 is a graph illustrating diffusion depth of aluminum into copper, low carbon steel, and stainless steel at various temperatures over a period of ½ hour.

FIG. 6 illustrates the steps in the slurrying of copper-brazed regenerator cores in an aluminum slurry.

FIG. 7 is a graph showing the relationship between percent aluminum distribution across the thickness of a core and the average overall percent of slurry weight gain (SWG) resulting from dipping a core into an aluminum slurry.

FIG. 8 is a graph showing the relationship between the percent aluminum diffused into the copper joints and the percent of slurry weight gain (SWG); and also the upper limit of the percent aluminum in the alloy and the upper limits of diffusion temperature.

FIG. 9 is a graph illustrating the relationship between the oxidation resistance of treated regenerator core samples in terms of percent of fillets oxidized and the average percent of slurry weight gain.

FIG. 10 is a graph showing the relationship between the oxidation resistance of treated regenerator core samples in terms of oxidation weight gain and the average percent of slurry weight gain.

DESCRIPTION OF THE PREFERRED EMBODIMENT

While the invention is applicable, among other things, to copper-aluminum oxidation resistant joints generally and to matrix structures in general, it is described herein in connection with one type of structure to which it is particularly applicable; that is, turbine engine regenerator cores of the type shown in FIGS. 1, 2 and 3. Such cores typically consist of a rim 10, a hub 12 and a matrix portion generally indicated by 14, which is best shown in detail in FIG. 3. As can be seen from FIGS. 1 and 2, the regenerator is a relatively flat, round structure with a plurality of passageways extending axially through the matrix for the flow of gases therethrough. The passageways in the particular design shown are formed by alternately positioned corrugated layers 16 of stainless steel stock and flat layers 18 of stainless steel stock about 3½ inches wide and 0.002 inch thick. Other variations and designs of matrix type regenerator cores are known and this invention is applicable to them as well as to matrix structures in general.

When installed in an engine, hot gases enter one side of the regenerator matrix (the hot face) and leave at the opposite side (the cold face) as the regenerator rotates between a set of seals. Such systems, are described in U.S. Pat. Nos. 3,142,894; 3,157,226; 3,190,350; 3,190,351; 3,192,998; 3,202,207; 3,234,999 and 3,273,904.

To form an integral core structure the matrix parts of a regenerator are assembled together and the rim and hub are attached. According to this invention, in its preferred form, such an assembly is coated with a slurry of copper oxide and then heated in a reducing atmosphere, hydrogen being preferred, to reduce the copper oxide, forming molten copper which flows into all the various junctions between the parts, thus forming a brazed structure which is bonded with copper joints, after cool-down to room temperature. A slurry of copper flake may be used in place of the oxide in which case the hydrogen environment is not necessary. The joints are able to withstand operation at temperatures up to at least about 1400° F. In matrix structures, care should be taken to avoid plugging of the pasageways by excessive amounts of copper. In the case of the regenerator cores described herein, which are about 15½ inches in diameter, 3½ inches thick, about 1000 grams of copper has been found to be adequate for brazing the cores without undue plugging.

The application of the copper oxide slurry is not particularly critical insofar as its distribution over the assembly is concerned because of the tendency of molten copper to readily flow and wet the assembly when at brazing temperatures of about 1980° F. to 2050° F. Consequently, copper oxide slurries with a water vehicle may be used. The assembly is simply dipped and rinsed if excess slurry appears to be present. Hydrogen heating of a copper slurried assembly produces an assembly having copper brazed joints. Other means of providing copper joints, such as using slurries containing copper flake or powder or others may be used with this invention. The particular technique of placing the copper to form the joint, whether by slurry or any other technique, is not important to this invention.

According to the preferred form of this invention the copper brazed assembly is subjected to a "slurrying" step wherein the assembly is coated with an aluminum slurry following which it is heated to diffuse the aluminum into the copper joints thereby forming oxidation resistant copper-aluminum alloy at the joints. Incidentally, diffusion of the aluminum into the steel parts of the core will also occur simultaneously if the slurry has been applied to it. In most cases this is beneficial. The curve of FIG. 5 illustrates the depth to which the diffusion of aluminum depending on temperature occurs into materials of the type described herein. A detailed procedure is described below for the preparation of regenerator cores of the type and size described above.

I. PREFERRED METHOD FOR COPPER BRAZING REGENERATOR CORES

A. Core Preparation
1. Degrease the core either by pouring cold degreasing fluid, such as trichloroethylene through the matrix or preferably by the use of a vapor degreaser using trichloroethylene vapors.
2. Dry and weigh the core.

B. Cuprous Oxide Slurry Preparation

1. Dilute Copper Brazing Paste* with water until the No. 4 Ford cup viscosity is about 55 to 60 seconds.
2. The resultant slurry should be strained before viscosity measurements. A 40 to 60 mesh screen preceded by a coarser screen to catch larger flakes is suitable.
3. The above viscosity range will deposit a satisfactory quantity of cuprous oxide in a regenerator core of the type and size described herein. Adjustments for other types of matrix structures may be readily made by those of ordinary skill in this art.
4. The slurry can be stored indefinitely in glass, rubber, plastic or stainless steel containers. (Ordinary steel containers corrode rapidly and contaminate the slurry.)

C. Application of the Cuprous Oxide Slurry
1. The core is preferably placed in a slurry fixture of the type shown in FIG. 4 designed to:
    1. provide a reservoir for several gallons of slurry,
    2. provide a closed chamber over the core that can be pressurized, and 3) support the core.
2. Connect a blower to the fixture. A blower similar to a Spencer Turbo-compressor rated at 270 cfm at 24 oz. pressure is suitable.
3. Pour approximately 5 gallons of prepared slurry through cover opening on slurry fixture onto the upper surface of the core.
4. Turn on the blower and adjust the back-pressure to maintain about 6 in. of water. Various pressures may be used so long as the slurry is forced through the matrix structure of the core. The volume of air may be increased when slurry has been forced through core, but it is preferred that about 6 in. of back-pressure not be exceeded in order to prevent disturbance of the coated surface.
5. Continue to blow air until the bottom of the core appears dry. Spray water on the bottom of the core or immerse the bottom of the core in water to unplug matrix and remove any drip edge.
6. Wipe off the bottom with a clean wet sponge and blow until dry.
7. Brush off any loose slurry flakes and weigh the core. If the weight of the cuprous oxide retained in the matrix is less than about 8% of the matrix weight (excluding the weight of the hub), add additional slurry uniformly to the top of the core. If the weight of cuprous oxide retained in the matrix is more than 10% of the matrix weight (excluding the weight of the hub), wash out the bottom of the core with water by spraying or dipping. These amounts may vary with other types of matrix structures.

D. Copper Brazing of the Core
1. Place the core in a heating chamber, supported so it will not sag and heat in a H₂ atmosphere to about 2050° F. for about ½ hour. Cool. The lower limit of brazing temperature is determined by the melting point of copper. The upper limit is determined by the grain boundry attack of the stock by the molten copper.

II. PREFERRED METHOD FOR ALUMINUM SLURRY PROCESSING OF COPPER BRAZED REGENERATOR CORES

A. Preparation of the core.
1. Remove excess copper from the rim and hub surfaces of the core. Cores having an abnormally high number of passages plugged with copper are unacceptable for slurrying because passages may become plugged with aluminum from the opposite face.
2. Weigh the core to nearest 10 grams.
3. Mask portions of core not to be aluminum coated such as the rib and hub surfaces.
4. Attach depth indicator on rim of core. This may be a piece of tape or simply a scratch mark to indicate the depth to which the core is to be dipped. (Oxidation resistant joints may only be required through part of the thickness of a core matrix depending on the temperature at which the hot face will operate and the core thickness.)
5. Handles may be attached on opposite points of core rim to facilitate handling.

B. Slurry Preparation (This is applicable to the specific cores described herein: variations may be made for other structures as required.)
1. Mix about 10 gallons of slurry from aluminum paste with a metallic binder. The preferred binder is Pierce & Stevens metallic binder B-9658, available from Pierce % Stevens Chemical Co., 710 Ohio Street, Buffalo, New York diluted with hexane: 3:1 hexane: P. & S. binder. The preferred aluminum paste is ⅔ Al flake and ⅓ mineral spirits. Federal specifications TTP-320A, Type 11, Class B. The preferred slurry uses 6 gallons hexane; 2 gallons P. & S. 25,560 g. Al paste.
   a. Adjust viscosity to about 250 centipoise by adding hexane. A Brookfield Synchro-Lectric Viscometer Model RVF-100 was used for viscosity measurements.
   b. Mixing is best done in an air driven, closed Binks mixer or equivalent to avoid evaporation and risk of fire.
2. Transfer the slurry to a tank for dipping, stir frequently.
   a. Maintain temperature substantially constant at about R. T. (72° F.).
   b. Add hexane as needed to maintain viscosity.
   c. Add additional slurry as needed to maintain an adequate dipping depth.

C. Dipping Procedure:
1. Lower the core into the slurry as shown in FIG. 6a, hot face down, to desired depth such as ⅔ thickness (⅔ T.), 1/2 T., etc., the thickness and depths being selected depending on the extent of the core in an axial direction to be rendered oxidation resistant.
2. Allow the slurry to rise in passages to level of indicator, i.e., the desired depth and thickness.
3. Lift the core from the slurry and shake out any excess as shown in FIG. 6b.
4. Knock out excess slurry by "banging" the core on the board frame as shown in FIG. 6c.
5. Blot the core on an absorbent material, such as open cell polyurethane foam (twice) while blowing air through the core, through the top of a suitable hood, as shown in FIG. 6d for example. A ½ hp ducted fan has been found to be adequate.
6. Turn the core over and continue blowing until dry as shown in FIG. 6e.
7. Remove any protective masking from the core and brush any excess aluminum from the matrix passage openings.
8. Weigh the core and calculate the percent slurry weight gain. The recommended and preferred weight gain is about 1.5% ± 0.4% of initial weight.
9. If the core is outside of the limits, it may be washed out with acetone to remove all slurry, and then re-slurried.
10. Adjust viscosity of slurry accordingly for the next core to be dipped.
11. The slurrying technique used will determine both the total amount of aluminum picked up by the core and its distribution within the individual matrix passages as shown in FIGS. 7 and 8 (SWG meaning slurry weight gain). In the case of regenerator cores, the most desirable distribution of aluminum varies from zero aluminum in an area at the cold face, to high aluminum at the hot face in an axial gradient through the core which corresponds to the operating temperature gradient through it, which in turn, dictates the requirement for the oxidation resistance. Aluminum within each passage of the core is distributed primarily at the copper joints and fillets because of surface tension forces which operate on the aluminum slurry. The stainless steel matrix benefits from some aluminum diffusion. In case of 430 stainless steel which contains 16–18% chrome, the oxidation resistance of the stock is improved with the diffusion of aluminum into it.

D. Diffusion Alloying: Heating of the slurried core at a temperature of about 1800° F. ± about 50° F. for a time sufficient to allow the aluminum to diffuse throughout the fillets and joints is ordinarily satisfactory. In this particular case, about 2 hours is adequate. Diffusion in a reducing atmosphere, such as hydrogen, is preferred but vacuum or inert atmosphere is acceptable.

FIG. 5 illustrates in general that diffusion into various materials may be controlled by adjusting temperature. Time is another diffusion variable. FIG. 9 illustrates that 1800° F. is the optimum temperature for diffusion of a minimum of 1.0% SWG of aluminum. Additional amounts of aluminum do not appreciably add to the oxidation resistance of the copper-aluminum alloy at 1400° F. FIG. 10 illustrates that oxidation resistance increases with increasing amounts of aluminum.

If the diffusion temperature is too low, the aluminium does not diffuse into the copper fillets and joints to any appreciable depth, thus not forming substantial amounts of oxidation-resistant copper-aluminum alloy. FIG. 8 illustrates that, if the diffusion temperature is too high, melting of the copper aluminum alloy during its formation occurs, causing loss of the fillets since the molten copper-aluminum does not "wet" appreciably. Thus, the processing temperature must be about 1800° F. ± about 50° F.

FIG. 8 also illustrates the relation between the percent slurry at any point in the core and the corresponding percent aluminum in copper at that point, both before and after diffusion. Approximately 70% of the aluminum slurry is utilized as aluminum in the copper-aluminum alloy and in the steel.

FIG. 8 also illustrates that the desired maximum range of percent aluminum in copper of from about 10% to 15% is obtained for about 1.5% to 2.5% slurry. Below 10% to 15% aluminum, oxidation resistance at 1400° F. decreases. Above 15% aluminum, the ductility of the alloy decreases appreciably.

III. CALCULATIONS: It is preferred that the aim be for 1.5% ± about 0.4% slurry weight gain (SWG) of the aluminum slurry for ⅔ dipping depth.

$$\frac{\text{Dipped wt. (cleaned)} - \text{Initial wt.}}{11,700} \times 100 = \% \, SWG$$

(assume matrix + Co = 11,700 g on 3½ inch core 15½ in diameter)
(10 g slurry wt. gain is about 0.085% SWG)
(10 centipoise difference is about 10 g SWG difference).

IV. POSSIBLE REASONS FOR VARIATION IN PERCENT SWG:

| | | |
|---|---|---|
| A. Slurry: | 1. | Evaporation of solvent. |
| | 2. | Settling of Al flake if not stirred. |
| | 3. | Temperature variations. |
| | 4. | Change in ratio of Al: spirits: P & S: hexane, due to dipping, evaporation, and hexane additions. |
| B. Core | 1. | Non-uniform passages. |
| | 2. | Blocked passages (Cu and or distortions). |
| | 3. | Split and other defects. |
| | 4. | Temperature variations. |
| C. Procedure | 1. | Non-uniform depth of dipping. |
| | 2. | Non-uniform level of slurry in passages due to core defects or variations in time of immersion or variations in slurry. |
| | 3. | Unintentional coating on surfaces other than those in the passages. |
| | 4. | Variations in shaking, banging or blotting. |
| D. Other Variables: | | |

With reference to FIGS. 5, 6, 7, 8, 9 and 10, it can be seen that the variables of (1) slurry composition, (2) slurrying technique, (3) time, and (4) temperature are all interrelated and should be considered insofar as optimizing the subject invention for any particular use is concerned.

Evaluation of Samples

Oxidation resistance at about 1400° F. has been the principal quality criterion of work pieces treated by the method of this invention because that is currently regarded as the most likely maximum operating temperature in turbine engines, the preferred usage of this invention. However, this invention provides materials which are believed to exhibit improved oxidation resistance at even higher temperatures. Oxidation resistance is a corollary of the gain in weight due to oxide formation under oxidizing conditions, such as exposure to circulating room air. The weight change at 1400° F. in milligrams per square centimeter, was measured and recorded periodically for samples which were exposed to such oxidizing conditions. The samples were also examined under a low power microscope to determine the mode of failure. All samples were periodically cycled from 1400° F. to room temperature by withdrawing them from the oxidation testing furnace when some of them were to be weighed. The basic examination consisted of an evaluation of the copper brazed fillets and joints after 100 hours of testing. If less than 10% of the copper fillets and joints had oxidized the treatment was considered to be "good." Samples with no oxidized joints were designated "very good."

Since the oxidation resistance of the copper joints is proportional to the aluminum content thereof, a sufficient quantity of aluminum slurry should be deposited at each joint to produce an oxidation resistant alloy, i.e., up to a maximum of about 10–15% aluminum, balance copper, as indicated in FIG. 8 for regenerator cores, depending on the elevated temperature to be sustained.

The diffusion time and temperature should be sufficient to produce uniformly alloyed joints. Excessive aluminum, that is greater than about 15% in the joints of a regenerator core is detrimental because high-aluminum-copper alloys tend to be brittle at room temperature. Aluminum also lowers the melting point of copper and decreases its wettability, causing loss of the fillets during diffusion.

About 10–15% aluminum by weight, balance copper is a composition most desirable for structures exposed to temperatures on the order of 1400° F. operating temperatures, such as regenerator cores. Lower temperatures may utilize lower amounts of aluminum for oxidation resistance. Higher temperatures require higher amounts of aluminum. However, high aluminum content can provide brittle alloys and, although oxidation resistant, composition must be selected in the context of the intended use.

* COPPER BRAZING PASTE

Typical Specification

A - General

1. This specification describes a grade of cuprous oxide brazing compound suitable for joining steel parts when used in conjunction with a reducing atmosphere brazing furnace. Brazing compound is applied to the joint area of the parts being joined. The cuprous oxide is reduced to metallic copper by the reaction of the reducing atmosphere at elevated temperatures. The metallic copper melts and forms the brazed joint between the parts being processed.

2. Suitable precautions must be taken in the preparation of this material to prevent it from being contaminated with foreign material or corrosion products formed by contact of the ingredients with mixing or packaging equipment or containers. Presence of material containing alkali or alkaline earth metals is harmful to the brazing furnace lining and must be avoided. Presence of iron compounds in concentration sufficient to affect viscosity stability during storage must be avoided. Phosphorus as copper phosphide must be avoided to prevent weak joint strength.

B - Requirements

| 1. Cuprous Oxide Specification | | |
|---|---|---|
| Cuprous Oxide (Cu$_2$O) | Min. | 95.0% |
| Cuprous Oxide plus Metallic Copper | Min. | 97.0% |
| Total Copper | Min. | 86.0% |
| Metals other than Copper | Max. | .2% |
| Sulfates | Max. | .05% |
| Chlorides | Max. | .02% |
| Silica | Max. | .08% |

2. Cuprous Oxide Particle Size

The effective particle size and particle size distribution of the cuprous oxide effects the brazing compound viscosity characteristics, settling rate during storage, and fluidity of the applied brazing compound. The desired particle size range varies from about 1–30 microns in diameter with most of the particles being in the 4–20 micron range.

3. Chemical Composition - Brazing Paste
Formulation of a typical batch.
Cuprous Oxide (95% Grade) - - - 1475.0 to 1500.0 lbs.

Methocel (Dow Chemical Company) (65 H.G. 400 or 4000 cps Grade) – 7.0 to 9.0 lbs.

Note: Use 400 cps grade Methocel with Pfizer cuprous oxide. Use 4000 cps grade Methocel with Greenback or Glidden cuprous oxide.

Pluronics L-64 (Wyandotte Chemical Company) – 3.75 to 4.0 lbs.

Carbowax 6000 (Carbide and Carbon Chemical Co.) – 14.5 to 15.0 lbs.

Glycol (Ethylene or Mixed Ethylene and Propylene) – 11.0 to 11.5 lbs.

Water to make – – – 100 gallons

4. Physical Properties

Viscosity and density should be measured at 78° ± 1° F. approximately 1 hour after mixing. The viscosity should be measured with a Brookfield viscosimeter using a No. 6 spindle running at 20 rpm.

a - Viscosity

Using 400 cps Methocel – 3000 to 7000 centipoise

Using 4000 cps Methocel – 8000 to 12,000 centipoise b - Density - Min. 20.0 lbs./gal.

Having thus described the invention, the exclusive rights and privileges claimed therein are defined as follows:

We claim:

1. A regenerator core comprising a rim, hub and matrix, the matrix being formed of pieces of metal joined by brazed joints comprised of a copper-aluminum alloy containing up to a maximum of about 15% aluminum by weight, balance essentially copper.

2. A regenerator core having a matrix defining a hot face and a cold face and a number of intermediate brazed joints, the joints being comprised of a copper-aluminum alloy, the aluminum content of which varies from a low value in the area of the cold face side of the matrix to a high value at the hot face of the matrix.

3. The core of claim 2 wherein the high value is limited to a maximum of about 15% by weight aluminum.

4. The core of claim 2 wherein the high value is between about 10% to 15% by weight aluminum.

5. The core of claim 2 wherein the matrix is essentially made up of steel.

6. The core of claim 2 wherein the matrix is comprised of steel containing aluminum also.

7. The core of claim 6 wherein the steel is 430 stainless steel.

* * * * *